(12) United States Patent
Zoeller et al.

(10) Patent No.: US 10,035,660 B2
(45) Date of Patent: Jul. 31, 2018

(54) CONVEYOR FACILITY HAVING A SAFETY FUNCTION

(71) Applicant: Eisenmann SE, Boeblingen (DE)

(72) Inventors: Joachim Zoeller, Ditzingen (DE); Bernd Niebel, Dettenhausen (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 15/509,523

(22) PCT Filed: Aug. 6, 2015

(86) PCT No.: PCT/EP2015/001624
§ 371 (c)(1),
(2) Date: Mar. 8, 2017

(87) PCT Pub. No.: WO2016/037673
PCT Pub. Date: Mar. 17, 2016

(65) Prior Publication Data
US 2017/0260007 A1    Sep. 14, 2017

(30) Foreign Application Priority Data

Sep. 10, 2014 (DE) ........................ 10 2014 013 500

(51) Int. Cl.
| | |
|---|---|
| *B65G 43/02* | (2006.01) |
| *H02H 3/00* | (2006.01) |
| *G05B 9/02* | (2006.01) |
| *B65G 43/00* | (2006.01) |

(52) U.S. Cl.
CPC .......... *B65G 43/00* (2013.01); *B65G 2207/40* (2013.01); *G05B 9/02* (2013.01); *H02H 3/00* (2013.01)

(58) Field of Classification Search
CPC ............. B65G 43/02; H02H 3/00; G05B 9/02
USPC ................................. 191/8; 198/502.1, 502.4
See application file for complete search history.

(56) References Cited

U.S. PATENT DOCUMENTS

| | | | | |
|---|---|---|---|---|
| 4,892,980 A | * | 1/1990 | Riley ..................... | B61L 3/185 191/14 |
| 4,924,164 A | * | 5/1990 | Riley ..................... | B61C 13/04 180/168 |
| 4,984,349 A | * | 1/1991 | Ohta ..................... | B23Q 7/1436 191/8 |
| 4,984,521 A | * | 1/1991 | Riley ..................... | B60L 15/20 104/290 |

(Continued)

FOREIGN PATENT DOCUMENTS

| | | |
|---|---|---|
| DE | 37 06 325 A1 | 9/1988 |
| DE | 101 39 318 A1 | 2/2003 |

(Continued)

*Primary Examiner* — Douglas A Hess
(74) *Attorney, Agent, or Firm* — Schroeder Intellectual Property Law Group, LLC

(57) ABSTRACT

A conveyor facility having at least one traveling unit, which has an electrical load, in particular an electric drive, and which can be moved along a conveyor path by means of the drive; and a railbus, which is arranged along the conveyor path and which has at least one supply collector wire via which the traveling unit is supplied with power. In order to reduce the space required by the railbus, a safety device is provided which has only one safety collector wire and yet ensures an emergency stop in a fault-tolerant manner.

11 Claims, 1 Drawing Sheet

(56) References Cited

U.S. PATENT DOCUMENTS

| | | | | |
|---|---|---|---|---|
| 5,503,259 | A | * | 4/1996 | Clopton .............. B23Q 1/0009 191/15 |
| 5,701,980 | A | * | 12/1997 | Lee ..................... B60L 1/04 191/4 |
| 6,371,265 | B1 | * | 4/2002 | Arrouy ................ H01H 33/16 191/2 |
| 6,751,048 | B2 | * | 6/2004 | Ostwald ............ G05B 19/4068 360/69 |
| 6,760,644 | B2 | * | 7/2004 | Canaday .............. G11B 15/682 318/567 |
| 6,904,549 | B2 | | 6/2005 | Jurisch et al. |
| 7,081,735 | B1 | * | 7/2006 | Malkowski, Jr. ....... H02P 25/18 318/723 |
| 8,154,400 | B2 | | 4/2012 | Engel et al. |
| 8,453,814 | B2 | * | 6/2013 | Gambach ............... B60L 9/30 191/3 |
| 9,352,653 | B2 | * | 5/2016 | Kawasaki .............. B60L 9/00 |
| 2003/0236598 | A1 | | 12/2003 | Antelo et al. |
| 2005/0173018 | A1 | | 8/2005 | Herre et al. |
| 2012/0175432 | A1 | | 7/2012 | Milojevic et al. |

FOREIGN PATENT DOCUMENTS

| | | |
|---|---|---|
| DE | 101 60 136 A1 | 6/2003 |
| DE | 10 2010 056 521 A1 | 7/2012 |
| JP | 2002-126608 A | 5/2002 |
| WO | 03/095106 A2 | 11/2003 |
| WO | 2007/137536 A1 | 12/2007 |
| WO | 2010/075322 A1 | 7/2010 |
| WO | 2012/089312 A1 | 7/2012 |

* cited by examiner

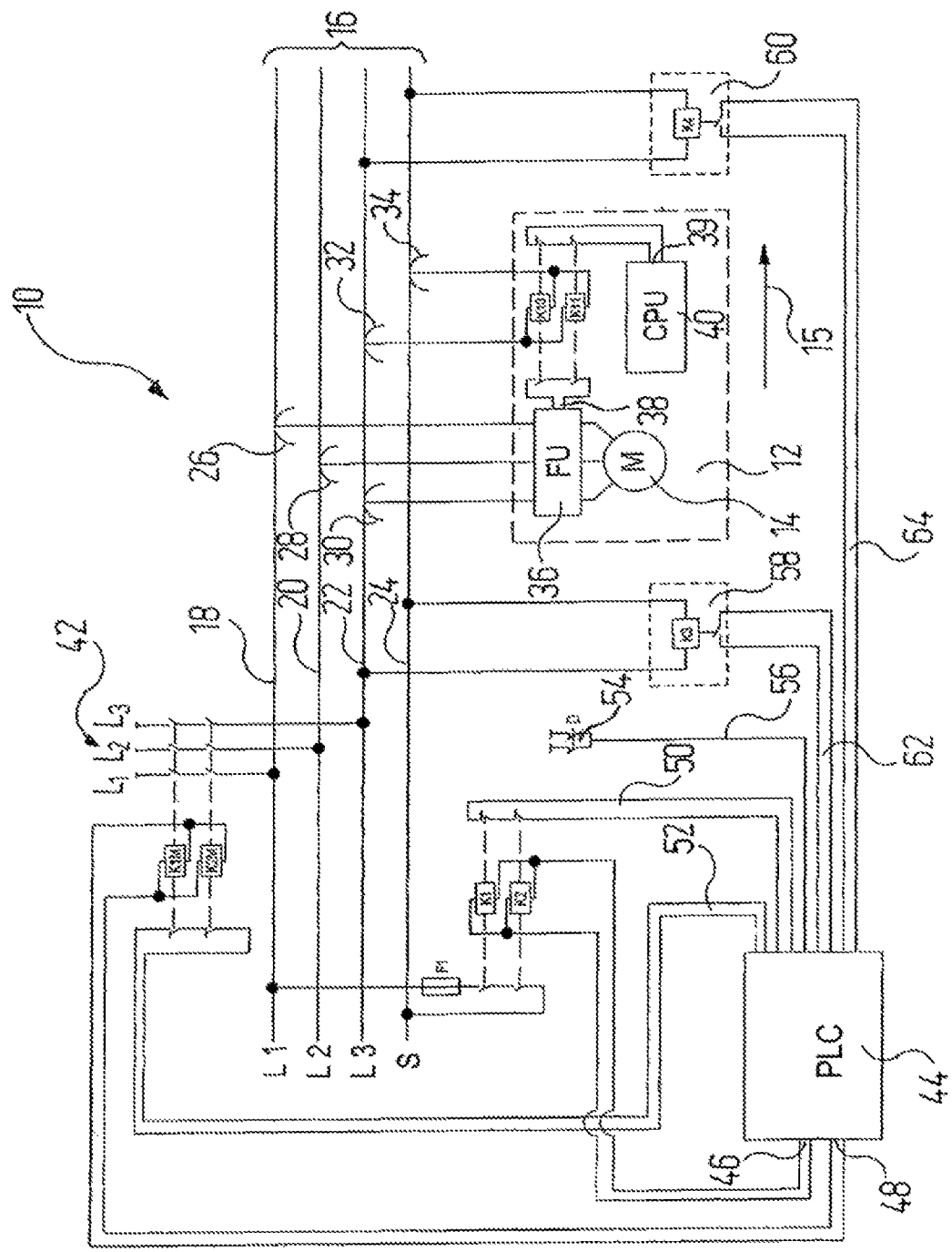

CONVEYOR FACILITY HAVING A SAFETY FUNCTION

RELATED APPLICATIONS

This application is a national phase of International Patent Application No. PCT/EP2015/001624, filed Aug. 6, 2015, which claims the filing benefit of German Patent Application No. 10 2014 013 500.4, filed Sep. 10, 2014, the contents of both of which are incorporated herein by reference.

BACKGROUND OF THE INVENTION

1. Field of the Invention

The invention relates to a conveyor installation having
a) at least one transporting unit that is displaceable along a conveying path and that comprises an entrained electrical load, and having
b) a busbar that is arranged along the conveying path and that comprises at least one power supply contact conductor by means of which the transporting unit is supplied with power.

2. Description of the Prior Art

An example of a conveyor installation of this kind is an electric telpher line, in the case of which a support running along the conveying path has usually a multiplicity of transporting units suspended from it that each have a drive of their own in order to compel themselves independently. The transporting units are in this case supplied with the power required for the propulsion by means of a busbar running along the conveying path, which busbar has sliding contacts of the transporting units engaging with it. An electric telpher line of this kind is therefore often also referred to as a busbar-powered conveyor installation.

Most conveyor facilities of this kind are operated in mixed work environments in which both partially or fully automated transporting units and human beings are moving. In order to protect the human beings from injuries, particularly as a result of movements by the transporting units, the conveyor facilities comprise safety devices that provide different safety functions.

There are increased demands on the reliability of such a safety device. These demands are defined by means of the DIN EN ISO 13849 standard, for example. In particular, this standard requires the overall design of a safety function, such as the possibility of triggering an emergency stop for the transporting units, for example, to ensure that not one single fault in one of the parts relevant to the safety function results in said safety function not being performed correctly. Further, the safety function should be designed such that a fault that has occurred is detected at least before a fresh demand on the safety function.

For this purpose, the busbars of conveyor facilities known hitherto have two safety contact conductors by means of which a safety function, such as an emergency stop, for example, is realized in redundant fashion.

Since the installation space available for the busbar is limited in the conveyor facilities, however, it would be advantageous to reduce the number of contact conductors. In particular, installation space freed up thereby could be used for installing a position code, for example. In this regard, cf. DE 10 2010 056 521 A1 from the applicant. In addition, the cost involvement for such a busbar would be decreased.

SUMMARY OF THE INVENTION

It is therefore an object of the present invention to specify a conveyor installation for which a safety function is realized with fewer safety contact conductors.

According to the invention, this may be achieved by a conveyor installation of the type cited at the outset in which
c) a safety device is provided that
  comprises a, particularly precisely one, safety contact conductor that is live during normal operation,
  comprises a first safety circuit, which, if necessary, de-energizes the safety contact contactor,
  comprises a monitoring means, which monitors whether the safety contact conductor is de-energized, and that
  comprises a second safety circuit, which de-energizes the at least one power supply contact conductor if the monitoring means detects that the safety contact conductor is not de-energized even though the first circuit should have de-energized the safety contact conductor,
d) and for which the transporting unit entrains
  a monitoring circuit that detects when there is no further voltage on the safety contact conductor, and
  a stop device, which then switches off the electrical load of the transporting unit and/or blocks movements by the transporting unit.

The inventors have recognized that, instead of two simultaneously connected safety contact conductors, a fault-tolerant safety function within the context of the aforementioned standard can also be achieved by virtue of the safety device using only one safety contact conductor, but, in the event of a fault, the power supply contact conductor by means of which the entrained load is supplied with power is additionally de-energized.

In principle, the inventive concept of converting parallel redundancy of a safety device into temporally successive redundancy can be used to reduce the number of safety contact conductors generally. However, the use of only one instead of two safety contact conductors will be particularly preferred, since the standard only provides tolerance toward one fault.

The electrical load is understood to mean primarily such devices as directly or indirectly present a hazard potential for human beings. As such, this may be a welding electrode on a rail-guided welding robot or a self-activated brake on a lifting station, for example. An electrical load may, however, also be understood to mean a controllable switch, such as a relay or a contactor, or an electrically controllable valve and the like. These could in turn operate, by way of example, pneumatic or hydraulic actuators of a lifting table or the like entrained by the transporting unit.

Preferably, the electrical load is an electric drive, however, that can be used to displace the transporting unit along the conveying path and/or that is used to realize other movements. An electric drive of such kind can be used to move the individual transporting units individually and independently of one another through the conveyor installation, and the transporting units can still be reliably put, by means of the safety device according to the invention, into a state in which they perform no further movements of their own endangering human beings.

Preferably, the monitoring means comprises at least one monitoring circuit arranged statically outside the transporting unit. Such a monitoring circuit may be, by way of example, a controllable switch, such as a contactor or a relay, for example, whose control input is connected to the safety contact conductor.

Statically arranged monitoring circuits of this kind may be arranged repeatedly along the path of travel, as a result of which redundancy is realized for the monitoring of the voltage state of the safety contact conductor. Preferably, the statically arranged monitoring circuit will be of analogous design to the monitoring circuit entrained by the transporting unit. In particular, it is possible to use the same type of controllable switch as in the transporting unit, which means that the entrained monitoring circuit and the statically arranged monitoring circuit exhibit the same response behavior.

The monitoring means can, however, also comprise a reporting circuit that is entrained by the transporting unit and that reports at least indirectly when there is no further voltage on the safety contact conductor, as a result of which, when the first circuit should have de-energized the safety contact conductor, the absence of a report leads to detection that the safety contact conductor is not de-energized. The report from the individual transporting units can in this case be transmitted via a control channel that is present anyway, for example via a control contact conductor, to a central controller that includes or interacts with parts of the safety device.

Further, the first safety circuit can comprise two controllable switches, particularly contactors, that are connected in series on the output side and that, during normal operation, connect the safety contact conductor to the at least one power supply contact conductor. The series circuit ensures fault tolerance for the controllable switches, which means that the safety function is performed reliably even when one of the switches does not drop, for example on account of a jammed switching armature. In order to detect faulty operation of a switch, monitoring outputs of the switches are monitored. To this end, the monitoring outputs may be connected to other parts of the safety device, for example to a controller.

Preferably, the second safety circuit comprises two controllable switches, particularly contactors, that are connected in series on the output side and that, during normal operation, connect the at least one power supply contact conductor to a power supply. In this case too, the use of two switches achieves greater fault tolerance.

The stop device of the transporting unit can comprise two controllable switches, particularly contactors, that are connected in series on the output side and that, during normal operation, close a disable input of the transporting unit. Such a disable input is what is known as the safe torque off input of a frequency converter of the electric drive, for example. However, such a disable input can also be understood to mean a simple motor contactor that is used to isolate an electric motor from its power supply.

Preferably, the electrical load, particularly the electric drive, operates with a 3-phase current, which means that the busbar comprises three power supply contact conductors, which carry the three phases of the three phase current. In that case, the safety contact conductor is, during normal operation, live with respect to at least one of the power supply contact conductors.

The safety device further comprises a trip switch by means of which the need for the safety function is activated. This can be accomplished particularly by an operator who operates an emergency stop switch associated with the safety function. Other trip switches would be, by way of example, safety doors, step guard mats or safety light barriers that are used to monitor a safety area of the conveyor installation. The safety function can alternatively be activated by a superordinate controller in order to ensure safe stoppage of the installation, for example for maintenance.

The safety device by means of which a safety function, such as an emergency stop, for example, of the conveyor installation is realized will preferably be realized overall by means of a failsafe programmable logic controller (PLC). Accordingly, at least parts of the safety device are located in the failsafe programmable logic controller. In particular, parts of the first and second circuits are located in the PLC.

In addition, a PLC can be used in a simple manner to monitor feedback from the individual controllable switches of the individual circuits, so that a switch operating in a faulty manner can be detected, for example.

In principle, the inventive concept is also realizable by means of direct interconnections of the individual components without a PLC, however.

Finally, the safety contact conductor may be divided along the conveying path into sections that are smaller than sections of the power supply contact conductor. This allows emergency stops limited to smaller areas to be implemented without the whole conveyor installation needing to be stopped.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

The invention is explained below on the basis of an exemplary embodiment with reference to the single drawing, in which:

FIG. 1 shows a schematic depiction of the electrical circuitry of a conveyor installation.

DETAILED DESCRIPTION OF A PREFERRED EXEMPLARY EMBODIMENT

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIG. 1 schematically shows the electrical circuitry of a conveyor installation 10, not depicted in more detail, having at least one transporting unit 12 that comprises a three-phase AC motor 14 as an entrained electrical load and is displaceable along a conveying path 15.

For the purpose of supplying electric power to the three-phase AC motor 14, there is provided, along the conveying path 15, a busbar, denoted as a whole by 16, that comprises four electrically conductive contact conductors in the exemplary embodiment shown here. Among these are the three power supply contact conductors 18, 20 and 22, which each comprise one of the three phases L1, L2 and L3 of a 3-phase power supply.

Further, the busbar 16 has a safety contact conductor 24. This is connected to the power supply contact conductor 18, i.e. the phase L1, via a fuse F1 and two contactors K1, K2, as controllable switches, connected in series on the output side (make contacts). Alternatively, the safety contact conductor 24 may also be provided in a dedicated busbar that is separate from the power supply contact conductors 18, 20, 22.

A control contact conductor, by means of which CAN BUS control signals, for example, are transmitted to the transport unit 12, is not shown. Likewise not shown are contact conductors for connecting a neutral conductor and a PE conductor.

To collect the current from the busbar 16, the transporting unit 12 has three power supply sliding contacts 26, 28 and 30 that are each in contact with the supply lines 18, 20 and 22. Further, the transporting unit 12 has two safety sliding contacts 32 and 34 that bear against the power supply contact conductor 22 and the safety contact conductor 24, respectively.

The power supply sliding contacts 26, 28 and 30 are connected on the transporting unit 12 to a frequency converter 36 of the electric drive, which in turn is connected to the three-phase AC motor 14. The frequency converter 36 is used to control the direction and power of the three-phase AC motor 14 and hence the movement of the transporting unit 12 on the basis of the commands transmitted to the transporting unit 12, for example via the control contact conductor.

The frequency converter 36 further has what is known as a "safe torque off" input (STO input) 38 that, when opened, disconnects the frequency converter 36 and thus ensures that the three-phase AC motor 14 causes no further torque. This safely prevents dangerous proper motion by the transporting unit 12. The STO input 38 is controlled by means of two contactors K10, K11, connected in series on the output side, that are connected in parallel on the input side and are connected to the safety sliding contacts 32 and 34. Finally, monitoring outputs (break contacts), likewise connected in series, contactors K10, K11 in the attracted state also open an input 39 of an onboard logic unit 40 of the transporting unit 12. Thus, if one of the contactors K10, K11 does not drop, then the input 39 remains open.

To supply the busbar 16 with the necessary three-phase current, the power supply contact conductors 18, 20 and 22 are each connected to a power supply 42 of a domestic installation, not shown in more detail, via two contactors K1M and K2M connected in series on the output side.

At the bottom left of FIG. 1, a failsafe programmable logic controller (PLC) 44 is shown. This uses a first output 46 to actuate each of the contactors K1 and K2 in parallel on the input side. Further, the PLC 44 uses a second output 48 to actuate the contactors K1M and K2M likewise in parallel.

Connected to it on the input side, the PLC 44 has a feedback line 50 connected to break contacts of the contactors K1 and K2, a feedback line 52 connected to break contacts of the contactors K1M and K2M and a line 56 coming from an emergency stop pushbutton switch 54.

Finally, FIG. 1 also shows, in the present exemplary embodiment, two statically arranged, i.e. not entrained by the transporting unit 12, monitoring circuits 58 and 60 that each essentially comprise a contactor K3 or K4 that is connected on the input side to the power supply contact conductor 22 and the safety contact conductor 24. On the output side, contactors K3 and K4 close feedback lines 62 and 64, respectively, that are likewise connected to the failsafe PLC 44.

The conveyor installation 10 operates as follows:

During normal operation, the PLC 44 uses the contactors K1M and K2M to connect the power supply contact conductors 18, 20 and 22 of the busbar 16 to the power supply 42 of the domestic installation. In this case, the contactors K1 and K2 are also actuated, so that the power supply contact conductor 18 is connected to the safety contact conductor 24, as a result of which the safety contact conductor 24 has a voltage with respect to the power supply contact conductor 22 that carries the phase L3 on account of the phase shift in the different phases L1, L2 and L3.

This voltage between the power supply contact conductor 22 and the safety contact conductor 24 is picked up by the safety sliding contacts 32 and 34 and forwarded to the contactors K10 and K11, so that they switch, as a result of which firstly the onboard logic unit 40 of the transporting unit 12 has normal operation signaled to it and secondly the frequency converter 36 is enabled via the STO input 38.

The power supply sliding contacts 26, 28 and 30 are then used to operate the three-phase AC motor 14 of the transporting unit 12 in accordance with the required need for movement from the transporting unit 12.

In the case of an emergency situation in which, by way of example, an operator operates the emergency stop pushbutton switch 54, the failsafe PLC 44 first of all ensures that the contactors K1 and K2 drop, as a result of which the safety contact conductor 24 is isolated from the phase L1.

As a result, the safety contact conductor 24 is de-energized with respect to the power supply contact conductor 22, as a result of which the contactors K10, K11 on the transporting unit 12 drop. These disable the STO input 38 of the frequency converter 36, which disconnects the three-phase AC motor 14. Additionally or as an alternative, it is also possible in this case for a self-activating brake to be activated that mechanically blocks the movement by the transporting unit 12. This safely prevents dangerous proper motion by the transporting unit 12 in an emergency stop situation. In the case of transporting units that have further drives for moving other entrained components, such as, by way of example, a lifting conveyor integrated in the transporting unit, these drives are also deactivated, meaning that any dangerous movement by the transporting units is prevented.

Further, the onboard logic unit 40 of the transporting unit 12 detects the emergency stop situation from the fact that the input 39 is closed, and reports this to the failsafe PLC 44, for example via a CAN BUS.

Should the safety contact conductor 24 be connected to the supply line 18 again, and therefore carry a voltage again, after the emergency stop situation has ended, then the onboard logic unit 40 may additionally contain provision for the transporting unit 12 to be able to be started up only after a further acknowledgment from a superordinate central controller or manually on the transporting unit 12.

By means of the monitoring circuits 58 and 60, the PLC 44 detects whether the safety contact conductor 24 was also actually de-energized in the emergency stop situation. The reason is that the contactors K3 and K4 arranged in the monitoring circuits also drop as soon as the safety contact conductor 24 is de-energized. Accordingly, the feedback lines 62 and 64 are opened. If this is not the case, for example on account of a short from the safety contact conductor 24 to the power supply contact conductor 18, then the PLC 44 uses the contactors K1M and K2M to isolate the entire busbar 16 from the power supply 42 of the domestic installation.

In this way, the power supply contact conductor 22 certainly carries no further voltage, which means that the contactors K10 and K11 on the transporting unit 12 drop and block the movement.

In summary, the emergency stop is then performed even if a fault occurs on one of the parts of the safety device.

As further or alternative monitoring of the de-energized state of the safety contact conductor 24, the PLC 44 can evaluate the fact that a fault may prompt the absence of the report from the onboard logic unit 40 that signals the emergency stop situation.

Since both the contactors K1 and K2 for connecting the supply line 18 to the safety contact conductor 24 and the statically arranged monitoring circuits 58 and 60 can be arranged repeatedly along the busbar 16, it is possible for the safety contact conductor 24 to be provided in electrically isolated form in sections, so that the emergency stop can also be activated just for individual sections along the conveying path. Only if there is a greater problem would it then be necessary for the supply lines 18, 20 and 22 that are continuous over multiple sections to be isolated as a whole from the power supply 42.

Although only a single transporting unit 12 is shown in the exemplary embodiment shown, it is readily evident to a person skilled in the art that the safety device described can be extended to multiple transporting units 12 situated along the conveying path 15 in a manner coupled to the busbar 16.

As an alternative to the 3-phase current powered conveyor installation 10 shown, the safety device according to the invention can also be applied to a one-phase power supply. In this case, only two power supply contact conductors for the phase L and the neutral conductor N and one safety contact conductor, which is connected to the phase L via appropriate contactors, are needed.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

We claim:

1. A conveyor installation comprising:
    a) at least one transporting unit that is displaceable along a conveying path and that comprises an entrained electrical load, and having
    b) a busbar that is arranged along the conveying path and that comprises at least one power supply contact conductor by means of which the at least one transporting unit is supplied with power, wherein
    c) a safety device is provided that
        comprises a safety contact conductor that is live during normal operation,
        comprises a first safety circuit which, if necessary, de-energizes the safety contact contactor,
        comprises a monitoring means, which monitors whether the safety contact conductor is de-energized, and that
        comprises a second safety circuit, which de-energizes the at least one power supply contact conductor if the monitoring means detects that the safety contact conductor is not de-energized even though the first safety circuit should have de-energized the safety contact conductor,
    d) and in that the at least one transporting unit (12) entrains
        a monitoring circuit that detects when there is no further voltage on the safety contact conductor, and
        a stop device, which then switches off the electrical load of the at least one transporting unit and/or blocks movements by the at least one transporting unit.

2. The conveyor installation as claimed in claim 1, wherein the electrical load is an electric drive that can be used to displace the at least one transporting unit along the conveying path and/or that is used to realize other movements.

3. The conveyor installation as claimed in claim 1, wherein the monitoring means comprises at least one monitoring circuit arranged statically outside the at least one transporting unit.

4. The conveyor installation as claimed in claim 1, wherein the monitoring means comprises a reporting circuit that is entrained by the transporting unit and that reports at least indirectly when there is no further voltage on the safety contact conductor, as a result of which, when the first safety circuit should have de-energized the safety contact conductor, the absence of a report leads to detection that the safety contact conductor is not de-energized.

5. The conveyor installation as claimed in claim 1, wherein the first safety circuit comprises two controllable switches that are connected in series on an output side and that, during normal operation, connect the safety contact conductor to the at least one power supply contact conductor.

6. The conveyor installation as claimed in claim 1, wherein the second safety circuit comprises two controllable switches that are connected in series on the output side and that, during normal operation, connect the at least one power supply contact conductor to a power supply.

7. The conveyor installation as claimed in claim 1, wherein the stop device of the at least one transporting unit comprises two controllable switches that are connected in series on an output side and that, during normal operation, close a disable input of the at least one transporting unit.

8. The conveyor installation as claimed in claim 1, wherein the electrical load operates with a three phase current and the busbar comprises three power supply contact conductors, which carry three phrases of the three-phase current, and in that the safety contact conductor, during normal operation, is live with respect to at least one of the supply contact conductors.

9. The conveyor installation as claimed in claim 1, wherein the safety device comprises a trip switch by means of which the need for the safety function is activated.

10. The conveyor installation as claimed in claim 1, wherein parts of the safety device are realized in a failsafe programmable logic controller.

11. The conveyor installation as claimed in claim 1, wherein the safety contact conductor is divided along the conveying path into sections that are smaller than sections of the at least one power supply contact conductor.

* * * * *